United States Patent
Kawanami

(10) Patent No.: US 10,067,275 B2
(45) Date of Patent: Sep. 4, 2018

(54) LAMINATED REFLECTIVE FILM HAVING REDUCED ALKALI METAL OR ALKALINE EARTH METAL TO POLYVINYL ALCOHOL RESIN RATIO

(71) Applicant: Konica Minolta, Inc., Tokyo (JP)

(72) Inventor: Akito Kawanami, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 245 days.

(21) Appl. No.: 14/902,724

(22) PCT Filed: Jul. 2, 2014

(86) PCT No.: PCT/JP2014/067705
§ 371 (c)(1),
(2) Date: Jan. 4, 2016

(87) PCT Pub. No.: WO2015/005199
PCT Pub. Date: Jan. 15, 2015

(65) Prior Publication Data
US 2016/0178818 A1    Jun. 23, 2016

(30) Foreign Application Priority Data
Jul. 8, 2013   (JP) .................. 2013-143026

(51) Int. Cl.
*G02B 5/08* (2006.01)
*G02B 5/28* (2006.01)
*G02B 5/20* (2006.01)
*B29D 11/00* (2006.01)
*B32B 7/02* (2006.01)
*B32B 27/08* (2006.01)
*B32B 27/20* (2006.01)
*B32B 27/30* (2006.01)

(52) U.S. Cl.
CPC ........ *G02B 5/282* (2013.01); *B29D 11/00596* (2013.01); *B29D 11/00634* (2013.01); *B32B 7/02* (2013.01); *B32B 27/08* (2013.01); *B32B 27/20* (2013.01); *B32B 27/306* (2013.01); *G02B 5/0816* (2013.01); *G02B 5/208* (2013.01); *G02B 5/287* (2013.01); *B32B 2264/102* (2013.01); *B32B 2264/105* (2013.01); *B32B 2264/12* (2013.01); *B32B 2307/416* (2013.01); *B32B 2307/418* (2013.01); *B32B 2307/42* (2013.01); *B32B 2457/20* (2013.01)

(58) Field of Classification Search
CPC ........ B29D 11/00596; B29D 11/00634; B32B 17/10633; B32B 17/10449; B32B 2457/20; B32B 27/08; B32B 27/20; B32B 27/306; B32B 2264/102; B32B 2264/105; B32B 2264/12; B32B 2307/416; B32B 2307/418; B32B 2307/42; B32B 7/02; G02B 1/10; G02B 5/0816; G02B 5/208; G02B 5/26; G02B 5/282; G02B 5/287
USPC ........ 252/587; 359/359, 360, 580, 584, 585, 359/586, 589, 839, 884; 427/162
See application file for complete search history.

(56) References Cited

U.S. PATENT DOCUMENTS

2013/0107355 A1 * 5/2013 Kokeguchi ............ G02B 5/208
359/359

FOREIGN PATENT DOCUMENTS

| JP | 2009-086659 A | 4/2009 | |
|---|---|---|---|
| JP | 2012-185342 A | 9/2012 | |
| JP | 2013-109111 A | 6/2013 | |
| WO | WO 2012014607 A1 * | 2/2012 | ............ G02B 5/208 |
| WO | 2013077274 A1 | 5/2013 | |

OTHER PUBLICATIONS

International Search Report and Written Opinion for International Application No. PCT/JP2014/067705.

* cited by examiner

*Primary Examiner* — Stephone B Allen
*Assistant Examiner* — Ryan S Dunning
(74) *Attorney, Agent, or Firm* — Lucas & Mercanti, LLP

(57) ABSTRACT

To provide a laminated reflective film having excellent discoloration resistance and adhesion between refractive index layers.

A laminated reflective film including a substrate and a reflective layer including a high refractive index layer and a low refractive index layer disposed on the substrate, wherein at least one of the high refractive index layer and the low refractive index layer includes a polyvinyl alcohol resin, metal oxide particles, and a first metal ion formed of an alkali metal ion and/or an alkaline earth metal ion, and the content ratio of the first metal ion represented by the following Formula (1):

$$\text{content ratio of first metal ion} = \frac{\text{content of first metal ion}}{\text{content of polyvinyl alcohol resin}} \times 100 \quad (1)$$

is 1.25 or less.

19 Claims, No Drawings

LAMINATED REFLECTIVE FILM HAVING REDUCED ALKALI METAL OR ALKALINE EARTH METAL TO POLYVINYL ALCOHOL RESIN RATIO

CROSS REFERENCE TO RELATED APPLICATION

This Application is a 371 of PCT/JP2014/067705 filed on Jul. 2, 2014 which, in turn, claimed the priority of Japanese Patent Application No. JP2013-143026 filed on Jul. 8, 2013, both applications are incorporated herein by reference.

TECHNICAL FIELD

The present invention relates to a laminated reflective film, a method for manufacturing the same, and an infrared shielding body including the same.

BACKGROUND ART

A laminated reflective film means a film which can reflect and absorb light having a predetermined wavelength, and usually has a structure in which reflective layers are laminated on a substrate.

As the laminated reflective film, for example, JP 2009-86659 A describes an invention relating to a heat ray shielding film which transmits visible rays and selectively reflects near-infrared rays, and a laminated body including the same. In this case, the heat ray shielding film described in JP 2009-86659 A is characterized in including a high refractive index layer having a minimum transmittance (TMIN) of 90% or less in a wavelength region of 750 nm or more and 1300 nm or less and including a resin layer containing inorganic particles having a refractive index of 1.75 or more.

The high refractive index layer included in the heat ray reflective film in JP 2009-86659 A includes inorganic particles in a resin for the high refractive index layer while the inorganic particles are dispersed. The heat ray reflective film thereby obtains a desired refractive index. In this case, JP 2009-86659 A describes that a specific wavelength is selectively reflected preferably by a laminated film in which a high refractive index layer and a low refractive index layer having controlled optical film thicknesses are laminated alternately.

In addition, JP 2009-86659 A describes that a refractive index layer such as a high refractive index layer is formed by a so-called wet film forming method from a viewpoint of manufacturing cost or the like. In the wet film forming method, a coating solution including inorganic particles, a water-soluble polymer, and a solvent is coated on a substrate, dried, and the like.

SUMMARY OF INVENTION

In a refractive index layer including inorganic particles and a water-soluble polymer, such as the heat ray reflective film described in JP 2009-86659 A, a preferable water-soluble polymer is selected appropriately from viewpoints of coating performance of a coating liquid when the refractive index layer is formed by the wet film forming method, performance of the obtained refractive index layer, and the like. Above all, a polyvinyl alcohol resin is preferably used as a water-soluble polymer for forming a desired refractive index layer.

However, it has been found that when the refractive index layer includes a polyvinyl alcohol resin and inorganic particles, particularly under a high temperature and a high humidity, a laminated reflective film may be discolored and adhesion between the refractive index layers may be reduced. In such a case, for example, when the laminated reflective film is used for a flat panel display or window glass, there is a possibility that required transparency or durability cannot be realized.

Therefore, an object of the present invention is to provide a laminated reflective film having excellent discoloration resistance and adhesion between refractive index layers.

The present inventors made intensive studies. As a result, the present inventors have found that the above-described problems can be solved by reducing an amount (s) of an alkali metal ion and/or an alkaline earth metal ion which can be included in a refractive index layer including a polyvinyl alcohol resin and inorganic particles, and have completed the present invention.

That is, the above-described object of the present invention can be achieved by the following means.

1. A laminated reflective film including a substrate and a reflective layer including a high refractive index layer and a low refractive index layer disposed on the substrate, wherein at least one of the high refractive index layer and the low refractive index layer includes a polyvinyl alcohol resin, metal oxide particles, and a first metal ion formed of an alkali metal ion and/or an alkaline earth metal ion, and the content ratio of the first metal ion represented by the following Formula (1):

[Numerical Formula 1]

$$\text{content ratio of first metal ion} = \frac{\text{content of first metal ion}}{\text{content of polyvinyl alcohol resin}} \times 100 \quad (1)$$

is 1.25 or less.

2. The laminated reflective film according to the above 1, wherein the low refractive index layer includes the polyvinyl alcohol resin, the metal oxide particles, and the first metal ion.

3. The laminated reflective film according to the above 1 or 2, wherein the first metal ion is a sodium ion and/or a potassium ion.

4. The laminated reflective film according to any one of the above 1 to 3, wherein the first metal ion includes a sodium ion, and the content ratio of the sodium ion represented by the following Formula (2):

[Numerical Formula 2]

$$\text{content ratio of sodium ion} = \frac{\text{content of sodium ion}}{\text{content of polyvinyl alcohol resin}} \times 100 \quad (2)$$

is 0.4 or less.

5. A method for manufacturing the laminated reflective film according to any one of the above 1 to 4, including: a step (1) of preparing a coating liquid including a polyvinyl alcohol resin, metal oxide particles, a metal ion formed of an alkali metal ion and/or an alkaline earth metal ion, and a solvent; and a step (2) of coating the coating liquid on a substrate.

6. An infrared shielding body including the laminated reflective film according to any one of the above 1 to 4 or a laminated reflective film manufactured by the method of the above 5.

DESCRIPTION OF EMBODIMENTS

Hereinafter, embodiments for carrying out the present invention will be described in detail.

One embodiment of the present invention provides a laminated reflective film including a substrate and a reflective layer including a low refractive index layer and a high refractive index layer disposed on the substrate. In this case, the laminated reflective film is characterized in that at least one of the low refractive index layer and the high refractive index layer includes a polyvinyl alcohol resin, metal oxide particles, and a first metal ion formed of an alkali metal ion and/or an alkaline earth metal ion, and the content ratio of the first metal ion represented by the following Formula (1) is 1.25 or less. According to the present invention, it is possible to provide a laminated reflective film having excellent discoloration resistance and adhesion between refractive index layers.

[Numerical Formula 3]

$$\text{content ratio of first metal ion} = \frac{\text{content of first metal ion}}{\text{content of polyvinyl alcohol resin}} \times 100 \quad (1)$$

As described above, conventionally, particularly when a refractive index layer is formed by a wet film forming method, a polyvinyl alcohol resin has been preferably used as a water-soluble polymer. However, a laminated reflective film including a refractive index layer containing a polyvinyl alcohol resin and metal oxide particles may be discolored, and adhesion between the refractive index layers may be reduced, particularly under a high temperature and a high humidity.

According to the study of the present inventors, it has been found that the discoloration of the laminated reflective film and the reduction in adhesion between the refractive index layers are caused by a sodium ion, a potassium ion, a calcium ion, or the like included in the refractive index layers.

Here, the polyvinyl alcohol resin is industrially manufactured by radically polymerizing vinyl acetate and saponifying the resulting polyvinyl acetate appropriately. In this case, sodium hydroxide is used industrially in the saponification. Therefore, the resulting polyvinyl alcohol resin includes a sodium ion derived from the manufacturing step. Therefore, when the polyvinyl alcohol resin is used as a water-soluble polymer, the sodium ion or the like derived from a raw material may be mixed in the refractive index layer.

In addition, particularly when the refractive index layer is formed by the wet film forming method, a potassium ion, a calcium ion, or the like derived from a pH adjusting agent, a curing agent, or the like may be mixed in the refractive index layer.

An alkali metal ion such as a sodium ion or a potassium ion and an alkaline earth metal ion such as a calcium ion which can be mixed in the refractive index layer (here, the alkali metal ion and the alkaline earth metal ion are also collectively referred to as "first metal ion") cause the discoloration of the laminated reflective film and the reduction in adhesion between the refractive index layers.

A reason why the discoloration of the laminated reflective film and the reduction in adhesion between the refractive index layers are caused is not necessarily clarified, but the following mechanism is considered. However, the above-described mechanism is only based on estimation. A case where the discoloration of the laminated reflective film and the reduction in adhesion between the refractive index layers are caused by another mechanism is also included in the technical range of the present invention.

Under a high temperature and a high humidity, a polyvinyl alcohol resin may be deteriorated. In this case, the deterioration is accelerated by the first metal ion. That is, the first metal ion can act as a catalyst for accelerating deterioration of the polyvinyl alcohol resin. For example, vinyl acetate or the like as a raw material residue which can be included in the polyvinyl alcohol resin reacts with the first metal ion to thereby generate a radical. This radical forms a double bond in a main chain of the polyvinyl alcohol resin. Deterioration of the polyvinyl alcohol resin converts a hydroxy group into a carbonyl group. It is considered that these deteriorations change an absorption wavelength, reduce hydrogen bonds, or the like, and as a result, the discoloration of the laminated reflective film and the reduction in adhesion between the refractive index layers are caused.

The polyvinyl alcohol resin and the first metal ion tend to exist near metal oxide particles. Therefore, the above-described deterioration reaction is easily caused by the existence of the metal oxide particles. In other words, in the refractive index layer including the first metal ion together with the polyvinyl alcohol resin and the metal oxide particles, the polyvinyl alcohol resin is easily deteriorated.

Focusing on the first metal ion which can be included in the refractive index layer, the present inventors have found that a laminated reflective film having excellent discoloration resistance and adhesion between refractive index layers is obtained by reducing the content ratio of the first metal ion with respect to the polyvinyl alcohol resin to a predetermined value and preventing deterioration of the polyvinyl alcohol resin.

Hereinafter, the configuration of the present invention will be described in detail.

<Laminated Reflective Film>

The laminated reflective film includes a substrate and a reflective layer containing a low refractive index layer and a high refractive index layer disposed on the substrate.

A ray which can be reflected and absorbed by the laminated reflective film is preferably a ray in an ultraviolet to infrared region having a wavelength of 200 nm to 1000 μm, more preferably a ray having a wavelength of 250 to 2500 nm, still more preferably a ray in a near infrared region having a wavelength of 700 to 1200 nm. It is possible to adjust a wavelength of a ray reflected by the laminated reflective film by appropriately controlling an optical film thickness of the reflective layer, the kind and the content of an additive, and the like. A laminated reflective film which reflects rays (ultraviolet rays) having a wavelength of 200 to 400 nm is also referred to as an "ultraviolet shielding film." A laminated reflective film which reflects rays (infrared rays) having a wavelength of 700 to 1200 nm is also referred to as an "infrared shielding film." In this case, the laminated reflective film can be also an ultraviolet-infrared shielding film which reflects both ultraviolet rays and infrared rays according to the configuration thereof. Preferably, the laminated reflective film does not reflect rays (visible rays) having a wavelength of 400 to 700 nm from a viewpoint of transparency of the film.

In the following description, as a typical example of the laminated reflective film, an infrared shielding film will be described. However, the present invention is not limited thereby.

<Infrared Shielding Film>

The infrared shielding film according to the present invention includes a substrate and a reflective layer containing a low refractive index layer and a high refractive index layer disposed on the substrate.

In an infrared shielding film, in general, it is preferable to design a difference between the low refractive index layer and the high refractive index layer largely from a viewpoint of being able to making an infrared reflectivity high with a small number of layers. In the present embodiment, at least one of differences in refractive index between the refractive index layers adjacent to each other is preferably 0.1 or more, more preferably 0.25 or more, still more preferably 0.3 or more, particularly preferably 0.35 or more, most preferably 0.4 or more. Furthermore, all the differences in refractive index between the laminated refractive index layers are preferably within the above preferable range. However, even in this case, of the refractive index layers constituting the reflective layer, the outermost layer and the lowermost layer may have configurations outside the above preferable range.

The reflectivity in a specific wavelength region is determined by a difference in refractive index between the refractive index layers adjacent to each other and the number of laminated layers. As the difference in refractive index is larger, the same reflectivity is obtained with a smaller number of laminated layers. The difference in refractive index and the necessary number of laminated layers can be calculated using a commercially available optical design software. For example, in order to obtain an infrared reflectivity of 90% or more, when the difference in refractive index is less than 0.1, it is necessary to laminate 200 or more layers. In such a case, reduction in productivity, increase in scattering on an interface of the laminated layers, reduction in transparency, and failure in manufacturing may occur.

As the optical characteristics of the infrared shielding film of the present embodiment, the transmittance in a visible light region is preferably 50% or more, more preferably 75% or more, still more preferably 85% or more. Furthermore, it is preferable to have a region exceeding a reflectivity 50% in a region of wavelengths 900 nm to 1400 nm. Here, the term "visible light transmittance" means transmittance in a visible light region indicated by JIS R3106-1998.

The thickness of the infrared shielding film of the present embodiment is preferably from 12 μm to 315 μm, more preferably from 15 m to 200 μm, still more preferably from 20 μm to 100 μm.

[Substrate]

A substrate of the infrared shielding film is not particularly limited, and a known resin film can be used. Examples thereof include a polyolefin film such as polyethylene or polypropylene; a polyester film such as polyethylene terephtalate, polyethylene naphtalate, or a polyester including a dicarboxylic acid component and a diol component as main components (hereinafter, also simply referred to as "polyester"); polyvinyl chloride; and cellulose triacetate. Among these compounds, a polyester is preferable, and a polyester including a dicarboxylic acid component and a diol component as main components is more preferable.

Examples of the dicarboxylic acid component include terephthalic acid, isophthalic acid, phthalic acid, 2,6-naphthalene dicarboxylic acid, 2,7-naphthalene dicarboxylic acid, diphenyl sulfone dicarboxylic acid, diphenylether dicarboxylic acid, diphenylethane dicarboxylic acid, cyclohexane dicarboxylic acid, diphenyl dicarboxylic acid, diphenyl thioether dicarboxylic acid, diphenyl ketone dicarboxylic acid, and phenylindan dicarboxylic acid.

Examples of the diol component include ethylene glycol, propylene glycol, tetramethylene glycol, cyclohexane dimethanol, 2,2-bis(4-hydroxyphenyl)propane, 2,2-bis(4-hydroxyethoxyphenyl)propane, bis(4-hydroxyphenyl)sulfone, bisphenol fluorene dihydroxyethyl ether, diethylene glycol, neopentyl glycol, hydroquinone, and cyclohexane diol.

Among polyesters including the above-described dicarboxylic acid component and diol component as main components, it is preferable to use a polyester including, as main components, terephthalic acid or 2,6-naphthalene dicarboxylic acid as the dicarboxylic acid component and ethylene glycol or 1,4-cyclohexane dimethanol as the diol component from viewpoints of transparency, mechanical strength, dimensional stability, and the like. Among these polyesters, it is more preferable to use a polyester including polyethylene terephthalate or polyethylene naphthalate as a main component, a copolyester formed of terephthalic acid, 2,6-naphthalene dicarboxylic acid, and ethylene glycol, or a polyester including a mixture of two or more kinds of these polyesters as main components.

The thickness of the substrate used in the present invention is preferably from 5 to 200 μm, more preferably from 15 to 200 μm. The substrate may be obtained by superimposing two sheets thereof. In this case, the kinds of the substrate may be the same or different.

The visible light transmittance of the substrate is preferably 85% or more, more preferably 90% or more. A substrate having a visible light transmittance of 85% or more is preferable from a viewpoint of making the visible light transmittance of an infrared shielding film 50% or more.

The substrate may be an unstretched film or a stretched film, but is preferably a stretched film from viewpoints of improving strength and suppressing thermal expansion.

The substrate used in the present invention can be manufactured by a conventionally known general method. For example, by melting a resin as a material by an extruder, extruding the resin by a circular die or a T-die, and rapidly cooling the resin, it is possible to manufacture a substantially amorphous, not oriented, and unstretched substrate. It is possible to manufacture a stretched substrate by stretching an unstretched substrate in a flow (vertical axis) direction of the substrate and/or in a perpendicular (horizontal axis) direction to the flow direction of the substrate, by a known method such as uniaxial stretching, tenter-type sequential biaxial stretching, tenter-type simultaneous biaxial stretching, or tubular type simultaneous biaxial stretching. In this case, a draw ratio can be appropriately selected according to a resin as a raw material of the substrate, but is preferably from 2 to 10 times in each of the vertical axis direction and the horizontal axis direction.

The substrate may be subjected to a relaxation treatment and an offline heat treatment from a viewpoint of dimensional stability. The relaxation treatment is preferably performed in a step in a tenter for horizontal stretching or before winding after the resin film leaves the tenter, after the resin film is thermally fixed in a stretching film formation step. The relaxation treatment is preferably performed at 80 to 200° C., more preferably at 100 to 180° C. The relaxation treatment is performed such that the relaxation ratio is preferably from 0.1 to 10%, more preferably from 2 to 6% in both a longitudinal direction and a width direction. The substrate which has been subjected to the relaxation treatment can have improved heat resistance and dimensional stability by further being subjected to the offline heat treatment.

An undercoat layer is preferably provided on one surface or both surfaces of the substrate in the film formation step. The undercoat layer can be formed in line or after the film formation. As a method for forming the undercoat layer, for example, an undercoat layer coating liquid is coated, and the resulting coating film is dried. The undercoat layer coating liquid usually includes a resin. Examples of the resin include a polyester resin, an acrylic-modified polyester resin, a polyurethane resin, an acrylic resin, a vinyl resin, a vinylidene chloride resin, a polyethyleneimine vinylidene resin, a polystyrene butadiene resin, a polyethyleneimine resin, a polyvinyl alcohol resin, and gelatin. A known additive may be added to the undercoat layer coating liquid. A method for coating the undercoat layer coating liquid is not particularly limited, but a known method such as a roll coating method, a gravure coating method, a knife coating method, a dip coating method, or a spray coating method can be used. The coating amount of the undercoat layer coating liquid is preferably from 0.01 to 2 g/m² in a dry state.

[Reflective Layer]

The reflective layer includes a low refractive index layer and a high refractive index layer.

The reflective layer is usually disposed on a substrate. In this case, the reflective layer(s) may be formed only on one surface of the substrate or on both surfaces thereof. When the reflective layers are formed on both surfaces of the substrate, the reflective layers on both surfaces may have the same configuration as or different configurations from each other.

Here, the "low refractive index layer" and the "high refractive index layer" are relatively determined by a relation to the refractive index of an adjacent layer. A refractive index layer can be a low refractive index layer or a high refractive index layer according to a relation to an adjacent refractive index layer. Specifically, a refractive index layer having a higher refractive index than an adjacent refractive index layer is a high refractive index layer (the adjacent layer is a low refractive index layer). On the other hand, a refractive index layer having a lower refractive index than an adjacent refractive index layer is a low refractive index layer (the adjacent layer is a high refractive index layer).

In one embodiment, in the reflective layer, a low refractive index layer and a high refractive index layer are laminated alternately. By such a configuration, when the reflective layer is irradiated with infrared light from a side of the substrate or a side of the reflective layer, the reflective layer preferably reflects at least a part of the infrared light and can exhibit an infrared shielding effect. However, the reflective layer may have another configuration as long as the reflective layer exhibits the infrared shielding effect.

The total number of the refractive index layers constituting the reflective layer is preferably from 9 to 250, more preferably from 12 to 100, still more preferably from 15 to 45.

The reflective layer preferably has a form in which refractive index layers are laminated as described above. In this case, both the refractive index layer (lowermost layer) in contact with the substrate of the laminated film and the outermost layer may be high refractive index layers or low refractive index layers. The lowermost layer and the outermost layer may be different refractive index layers (a low refractive index layer and a high refractive index layer). Among these configurations, both the lowermost layer and the outermost layer are preferably low refractive index layers from viewpoints of excellent adhesion to the substrate in the lowermost layer, excellent blown resistance in the outermost layer, and an excellent easy forming property, coating property, and adhesion of a hard coat layer or the like onto the outermost layer.

In the reflective layer, by mixture of components of a low refractive index layer and components of a high refractive index layer, there may be a portion having no clear interface, for example, a portion in which the interface is gradually changing. In such a case, a maximum refractive index and a minimum refractive index in the region having no clear interface are measured, a difference thereof Δn (maximum refractive index−minimum refractive index) is calculated, and a surface having the minimum refractive index +Δn/2 is regarded as a layer interface. In this case, the region having no clear interface can be confirmed with a tomograph by an electron microscope (TEM).

As described above, it is relatively determined by a relation to an adjacent refractive index layer whether a refractive index layer is a low refractive index layer or a high refractive index layer. A refractive index layer can be a low refractive index layer or a high refractive index layer. Hereinafter, typical configurations of a low refractive index layer and a high refractive index layer will be described.

(Low Refractive Index Layer)

In the present embodiment, a low refractive index layer includes a water-soluble polymer. In this case, the low refractive index layer may further include first metal oxide particles, a first metal ion, a second metal ion, a curing agent, a surfactant, and other additives, if necessary.

The refractive index of the low refractive index layer is preferably from 1.10 to 1.60, more preferably from 1.30 to 1.50.

The thickness per layer of the low refractive index layer is preferably from 20 to 800 nm, more preferably from 50 to 350 nm.

Water-Soluble Polymer

The water-soluble polymer according to the present invention means the following water-soluble polymer. That is, when a water-soluble polymer is dissolved in water so as to have a concentration of 0.5% by mass at a temperature at which the water-soluble polymer is dissolved most, and the resulting solution is filtered through a G2 glass filter (maximum pore: 40 to 50 μm), the mass of an insoluble matter separated thereby is 50% by mass or less with respect to the added water-soluble polymer.

The water-soluble polymer which can be used in the present invention is not particularly limited, but examples thereof include a polymer having a reactive functional group.

Examples of the polymer having a reactive functional group include a polyvinyl alcohol resin, an acrylic resin such as polyvinyl pyrrolidone, polyacrylic acid, an acrylic acid-acrylonitrile copolymer, a potassium acrylate-acrylonitrile copolymer, a vinyl acetate-acrylate copolymer, or an acrylic acid-acrylate copolymer, a styrene-acrylic acid resin such as a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer, a styrene-sodium styrene sulfonate copolymer, a styrene-2-hydroxyethyl acrylate copolymer, a styrene-2-hydroxyethyl acrylate-potassium styrene sulfonate copolymer, a styrene-maleic acid copolymer, a styrene-maleic anhydride copolymer, a vinyl naphthalene-acrylic acid copolymer, a vinyl naphthalene-maleic acid copolymer, a vinyl acetate copolymer such as vinyl acetate-maleate copolymer, a vinyl acetate-crotonic acid copolymer, or a vinyl acetate-acrylic acid copolymer, and salts thereof.

Among these polymers, a polyvinyl alcohol resin is particularly preferably used from viewpoints of reducing point-like failure and improving infrared reflection characteristics.

Examples of the polyvinyl alcohol resin include a normal polyvinyl alcohol obtained by hydrolyzing polyvinyl acetate and various modified polyvinyl alcohols.

The polyvinyl alcohol obtained by hydrolyzing vinyl acetate has an average polymerization degree preferably of 1,000 or more, particularly preferably of 1,500 to 5,000. The saponification degree thereof is preferably from 70 to 100%, particularly preferably from 80 to 99.9%.

Examples of the modified polyvinyl alcohol include a cation-modified polyvinyl alcohol, an anion-modified polyvinyl alcohol, a nonion-modified polyvinyl alcohol, and a vinyl alcohol polymer. Examples of the polyvinyl alcohol resin also include a vinyl acetate resin (for example, "Exceval" manufactured by Kuraray Co., Ltd.), a polyvinyl acetal resin obtained by reacting an aldehyde to a polyvinyl alcohol (for example, "S-LEC" manufactured by Sekisui Chemical Co., Ltd.), a silanol-modified polyvinyl alcohol having a silanol group (for example, "R-1130" manufactured by Kuraray Co., Ltd.), and a modified polyvinyl alcohol resin having an acetoacetyl group in the molecule (for example, "GOHSEFIMER (registered trademark) Z/WR Series" manufactured by Nippon Synthetic Chemical Industry Co., Ltd.).

Examples of the anion-modified polyvinyl alcohol include a polyvinyl alcohol having an anionic group, as described in JP 1-206088 A, a copolymer of vinyl alcohol and a vinyl compound having a water-soluble group, as described in JP 61-237681 A and JP 63-307979 A, and a modified polyvinyl alcohol having a water-soluble group, as described in JP 7-285265 A.

Examples of the nonion-modified polyvinyl alcohol include a polyvinyl alcohol derivative obtained by adding a polyalkylene oxide group to a part of vinyl alcohol, as described in JP 7-9758 A, a block copolymer of vinyl alcohol and a vinyl compound having a hydrophobic group, as described in JP-A 8-25795, a silanol-modified polyvinyl alcohol having a silanol group, and a reactive group-modified polyvinyl alcohol having a reactive group such as an acetoacetyl group, a carbonyl group, or a carboxyl group.

Examples of the cation-modified polyvinyl alcohol include a polyvinyl alcohol having a primary to tertiary amino group or a quaternary ammonium group in a main chain or a side chain of the polyvinyl alcohol, as described in JP 61-10483 A, obtained by saponifying a copolymer of vinyl acetate and an unsaturated ethylenic monomer having a cationic group.

Examples of the unsaturated ethylenic monomer having a cationic group include trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl) methacrylamide, hydroxyethyl trimethyl ammonium chloride, trimethyl-(2-methacrylamidopropyl)ammonium chloride, and N-(1,1-dimethyl-3-dimethylaminopropyl) acrylamide. The ratio of the cation-modified group-containing monomer in the cation-modified polyvinyl alcohol is preferably from 0.1 to 10 mol %, more preferably from 0.2 to 5 mol % with respect to vinyl acetate.

Examples of the vinyl alcohol polymer include Exceval (trade name: manufactured by Kuraray Co., Ltd.) and Nichigo G polymer (trade name: Nippon Synthetic Chemical Industry Co., Ltd.).

The water-soluble polymer may be used singly or in combination of two or more kinds thereof. The water-soluble polymer may be a synthetic product or a commercially available product.

The mass average molecular weight of the water-soluble polymer is preferably from 1,000 to 200,000, more preferably from 3,000 to 60,000. Here, as a value of the "mass average molecular weight", a value measured by a static light scattering method, gel permeation chromatography (GPC), TOFMASS, or the like is employed. A water-soluble polymer having a mass average molecular weight in the above range is preferable because coating by a wet film forming method is possible, and productivity can be improved.

The content of the water-soluble polymer in the refractive index layer is preferably from 5 to 75% by mass, more preferably from 10 to 70% by mass with respect to the total solid content 100% by mass of the low refractive index layer. The water-soluble polymer having a content of 5% by mass or more is preferable because deterioration of transparency of a film surface due to disturbance can be prevented when the low refractive index layer is formed by a wet film forming method and a coating film obtained by coating is dried. Meanwhile, the water-soluble polymer having a content of 75% by mass or less is preferable because the content of metal oxide particles is preferable when the metal oxide particles are included in the low refractive index layer, and a difference in refractive index between the low refractive index layer and the high refractive index layer can be made large. Here, the content of the water-soluble polymer can be determined from a residual solid content in an evaporation drying method. Specifically, an infrared shielding film is soaked in hot water at 95° C. for two hours. The remaining film is removed, and then the hot water is evaporated. The amount of the resulting solid matter is used as an amount of the water-soluble polymer. In this case, when in IR (infrared spectroscopy) spectrum, one peak is observed in each of 1700 to 1800 $cm^{-1}$, 900 to 1000 $cm^{-1}$, and 800 to 900 $cm^{-1}$, the water-soluble polymer can be determined to be a polyvinyl alcohol.

First Metal Oxide Particles

The first metal oxide particle means a metal oxide particle mainly included in the low refractive index layer.

The first metal oxide particle is not particularly limited. Examples thereof include zinc oxide, silicon dioxide such as synthetic amorphous silica or colloidal silica, alumina, and colloidal alumina. Among these particles, the first metal oxide particles are preferably silicon dioxide, particularly preferably colloidal silica.

The first metal oxide particles (preferably silicon dioxide) included in the low refractive index layer of the present invention have an average particle diameter (number average; diameter) preferably of 3 to 100 nm, more preferably of 3 to 50 nm.

Here, particles themselves or particles appearing on a cross section or a surface of the refractive index layer are observed with an electron microscope, particle diameters of any 1000 particles are measured, and a simple average value (number average) thereof is calculated to determine the average particle diameter (number average; diameter) of the metal oxide particles. Here, the particle diameter of each particle is represented by a diameter when a circle equal to a projected area thereof is assumed.

Colloidal silica used in the present invention is obtained by heat aging silica sol obtained by metathesis of sodium silicate with an acid or the like, or by making sodium silicate passing through an ion-exchange resin layer. For example, colloidal silica described in JP 57-14091 A, JP 60-219083 A, JP 60-219084 A, JP 61-20792 A, JP 61-188183 A, JP 63-17807 A, JP4-93284 A, JP 5-278324 A, JP 6-92011 A, JP6-183134 A, JP 6-297830 A, JP 7-81214 A, JP 7-101142 A, JP 7-179029 A, JP 7-137431 A, or WO 94/26530 A, is used.

Such colloidal silica may be a synthetic product or a commercially available product. Examples of the commercially available product include Snowtex series available from Nissan Chemical Industries, Ltd. (Snowtex OS, OXS, S, OS, 20, 30, 40, O, N, C, etc.).

A surface of colloidal silica may be cation-modified, or may be treated with Al, Ca, Mg, Ba, or the like.

The content of the first metal oxide particles in the low refractive index layer is preferably from 20 to 75 mass %, more preferably from 30 to 70% by mass, still more preferably from 35 to 69% by mass, particularly preferably from 40 to 68% by mass, with respect to 100% by mass of the total solid content of the low refractive index layer. The content of the first metal oxide particles of 20% by mass or more is preferable because a desired refractive index can be obtained. Meanwhile, the content of the first metal oxide particles of 75% by mass or less is preferable because excellent coatability is obtained.

The first metal oxide may be used singly or in combination of two or more kinds thereof from a viewpoint of adjusting a refractive index or the like.

First Metal Ion

In the present invention, at least one of the low refractive index layer and the high refractive index layer described below includes the first metal ion. The first metal ion is considered to be derived from a raw material when a polyvinyl alcohol resin is used as the water-soluble polymer, a pH adjusting agent, a curing agent, or the like.

The first metal ion is formed of an alkali metal ion and/or an alkaline earth metal ion. Examples of the alkali metal ion include a lithium ion, a sodium ion, a potassium ion, a rubidium ion, a cesium ion, and a francium ion. Examples of the alkaline earth metal ion include a calcium ion, a strontium ion, a barium ion, and a radium ion. Among these ions, an alkali metal ion is preferable, and a sodium ion or a potassium ion is more preferable. A sodium ion is still more preferable from a viewpoint of being mixed in a suitable water-soluble polymer as a component derived from a raw material.

The first metal ion may be included singly or in mixture of two or more kinds thereof.

The content of the first metal ion in the refractive index layer is preferably from 0.01 to 0.66% by volume, more preferably from 0.02 to 0.33% by volume with respect to the total solid content 100% by volume of the low refractive index layer. Here, as the content of the first metal ion, a value measured by an inductively coupled plasma atomic emission spectrometer (ICP-AES) is employed.

Second Metal Ion

The second metal ion means a metal ion other than the first metal ion which can be included in the low refractive index layer.

The second metal ion is not particularly limited. However, examples thereof include an aluminum ion, an iron ion, a titanium ion, and a zirconium ion.

Curing Agent

When the refractive index layer includes a water-soluble polymer, a curing agent cures the water-soluble polymer. Curing can impart water resistance to the refractive index layer.

The curing agent is not particularly limited as long as the curing agent causes a curing reaction with a water-soluble polymer. When the water-soluble polymer is a polyvinyl alcohol resin, boric acid and a salt thereof are preferably used. In addition, known compounds can be used. Examples thereof include a compound having a group generally capable of reacting with a water-soluble polymer, and a compound which promotes a reaction between different groups included in a water-soluble polymer. These compounds are selected appropriately to be used. Specific examples of the curing agent include an epoxy curing agent (diglycidyl ethyl ether, ethylene glycol diglycidyl ether, 1,4-butanediol diglycidyl ether, 1,6-diglycidyl cyclohexane, N,N-diglycidyl-4-glycidyloxy aniline, sorbitol polyglycidyl ether, glycerol polyglycidyl ether, etc.), an aldehyde curing agent (formaldehyde, glyoxal, etc.), an active halogen curing agent (2,4-dichloro-4-hydroxy-1,3,5,-s-triazine, etc.), an active vinyl compound (1,3,5-tris-acryloyl-hexahydro-s-triazine, bis-vinylsulfonyl methyl ether, etc.), aluminum alum, and boric sand.

The boric acid and a salt thereof mean an oxygen acid having a boron atom as the central atom and a salt thereof. Specific examples thereof include orthoboric acid, diboric acid, metaboric acid, tetraboric acid, pentaboric acid, octaboric acid, and salts thereof.

The boric acid having a boron atom and a salt thereof as a curing agent may be used in a form of an aqueous solution of one kind thereof or in mixture of two or more kinds thereof, but is particularly preferably used as a mixed aqueous solution of boric acid and boric sand. In general, each of the boric acid and the boric sand can be added only in a form of a relatively dilute aqueous solution. However, by mixing the two to obtain a mixed aqueous solution of boric acid and boric sand, it is possible to obtain a thick aqueous solution and to concentrate a coating liquid. It is possible to control the pH of an aqueous solution added relatively freely.

As the curing agent, at least one of a boric acid and a salt thereof, and boric sand is preferably used. In a case where at least one of a boric acid and a salt thereof, and boric sand is used, when a polyvinyl alcohol resin is used as a water-soluble polymer and metal oxide particles are used, a hydroxy group of the polyvinyl alcohol resin and the metal oxide particles more easily form a hydrogen bond network, and interlayer mixing between the high refractive index layer and the low refractive index layer is suppressed. It is considered that a preferable infrared shielding property is thereby achieved. Particularly when a setting type coating process is used, an effect can be exhibited more preferably. In the setting type coating process, multi layers of the high refractive index layer and the low refractive index layer are coated with a coater, then the film surface temperature of a coating film is temporarily lowered to about 15° C., and then the film surface is dried.

The content of the curing agent in the refractive index layer is preferably from 1 to 10% by mass, more preferably from 2 to 6% by mass with respect to the solid content 100% by mass of the refractive index layer.

Particularly when a polyvinyl alcohol resin is used as a water-soluble polymer, the total use amount of the curing agent is preferably from 1 to 600 mg, more preferably from 100 to 600 mg per g of the polyvinyl alcohol resin.

Surfactant

A surfactant adjusts surface tension of a coating liquid when the refractive index layer is formed by a wet film forming method.

The surfactant is not particularly limited. Examples thereof include an anioic surfactant, a nonionic surfactant, and an amphoteric surfactant. Among these surfactants, an anioic surfactant is preferably used. A compound containing a hydrophobic group having 8 to 30 carbon atoms and a sulfonic acid group or a salt thereof in one molecule is more preferably used.

Examples of the anioic surfactant include a surfactant selected from the group consisting of an alkylbenzene sulfonate, an alkylnaphthalene sulfonate, an alkane or olefin sulfonate, an alkyl sulfate, a polyoxyethylene alkyl or alkylaryl ether sulfate, an alkyl phosphate, an alkyl diphenylether disulfate, an ether carboxylate, an alkyl sulfosuccinate, an α-sulfofatty acid ester, and a fatty acid salt, a condensate of a higher fatty acid and an amino acid, and a naphthenate. Among these compounds, it is preferable to use a surfactant selected from the group consisting of an alkylbenzene sulfonate (preferably, a linear alkyl benzene sulfonate), an alkane or olefin sulfonate (preferably, a secondary alkane sulfonate, an α-olefin sulfonate), an alkyl sulfate, a polyoxyethylene alkyl or alkylaryl ether sulfate (preferably, a polyoxyethylene alkyl ether sulfate), an alkyl phosphate (preferably, a monoalkyl phosphate), an ether carboxylate, an alkyl sulfosuccinate, an α-sulfofatty acid ester, and a fatty acid salt. It is more preferable to use an alkyl sulfosuccinate.

Other Additives

Examples of the other additives include various known additives. Examples thereof include ultraviolet absorbers described in JP 57-74193 A, JP 57-87988 A, and JP 62-261476 A, anti-fading agents described in JP 57-74192 A, JP 57-87989 A, JP 60-72785 A, JP 61-146591 A, JP 1-95091 A, JP 3-13376 A, and the like, fluorescent brightening agents described in JP 59-42993 A, JP 59-52689 A, JP 62-280069 A, JP 61-242871 A, JP 4-219266 A, and the like, a pH adjusting agent such as sulfuric acid, phosphoric acid, acetic acid, citric acid, sodium hydroxide, potassium hydroxide, or potassium carbonate, an antifoaming agent, a lubricant such as diethylene glycol, a preservative agent, an antistatic agent, and a matting agent.

(High Refractive Index Layer)

In the present embodiment, the high refractive index layer includes a water-soluble polymer. In this case, the high refractive index layer may further include second metal oxide particles, a first metal ion, a second metal ion, a curing agent, a surfactant, and other additives, if necessary.

The refractive index of the high refractive index layer is preferably from 1.80 to 2.50, more preferably from 1.90 to 2.20.

The thickness per layer of the high refractive index layer is preferably from 20 to 800 nm, more preferably from 50 to 350 nm.

Water-Soluble Polymer

A water-soluble polymer similar to the water-soluble polymer described in the low refractive index layer is used. Therefore, description thereof will be omitted here. The water-soluble polymer used in the high refractive index layer is preferably the same as that used in the low refractive index layer.

Second Metal Oxide Particles

The second metal oxide particle means a metal oxide particle mainly included in the high refractive index layer. In this case, the second metal oxide particle is preferably different from the first metal oxide particle.

The second metal oxide particle is not particularly limited. Examples thereof include titanium oxide, zirconium oxide, zinc oxide, alumina, colloidal alumina, niobium oxide, europium oxide, and zircon. Among these particles, it is preferable to use titanium oxide or zirconium oxide, more preferable to use titanium oxide, and still more preferable to use rutile type (tetragonal) titanium oxide having a volume average particle diameter of 100 nm or less, from a viewpoint of forming a transparent high refractive index layer having a higher refractive index.

It is preferable to use titanium oxide which has become dispersible in water, an organic solvent, or the like by modifying a surface of titanium oxide sol. As a method for preparing aqueous titanium oxide sol, for example, descriptions in JP 63-17221 A, JP 7-819 A, JP 9-165218 A, JP 11-43327 A, JP 63-17221 A, and the like can be referred to.

When titanium oxide is used as the second metal oxide particles, as for other methods for manufacturing titanium oxide, for example, p255 to 258 (2000) of "Titanium oxide-Physical properties and applied technology" written by Manabu Kiyono, issued by Gihodo Shuppan Co., Ltd., or, a method of step (2) described in paragraphs "0011"–"0023" of WO 2007/039953 A can be referred to. The manufacturing method according to the step (2) includes a step (1) of treating a titanium oxide hydrate with at least one basic compound selected from the group consisting of an alkali metal hydroxide and an alkaline earth metal hydroxide, and a step (2) of treating the resulting titanium oxide dispersion with a carboxylic acid group-containing compound and an inorganic acid after the step (1).

The titanium oxide may be in a form of core-shell particles coated with a silicon-containing hydrated oxide. The core-shell particles have a structure in which a surface of the titanium oxide particles is coated with a shell including titanium oxide as a core and a silicon-containing hydrated oxide. In this case, the volume average particle diameter of the titanium oxide particle as a core part is preferably more than 1 nm and 50 nm or less, more preferably from 4 to 40 nm. By including such core-shell particles, an interaction between the silicon-containing hydrated oxide in the shell layer and a water-soluble polymer can suppress interlayer mixing between the low refractive index layer and the high refractive index layer.

The silicon-containing hydrated oxide may be any one of a hydrate of an inorganic silicon compound and a hydrolyzate and/or condensate of an organic silicon compound, but preferably has a silanol group. Therefore, the core-shell particle is preferably a silica-modified (silanol-modified) titanium oxide particle obtained by silica-modifying a titanium oxide particle.

The coating amount of the silicon-containing hydrated compound in titanium oxide is preferably from 3 to 30% by mass, more preferably from 3 to 10% by mass, still more preferably from 3 to 8% by mass, with respect to 100% by mass of titanium oxide. Titanium oxide having a coating amount of 3% by mass or more is preferable because core-shell particles can be formed stably. Meanwhile, titanium oxide having a coating amount of 30% by mass or less is preferable because the high refractive index layer has a desired refractive index.

As the second metal oxide particles, core-shell particles manufactured by a known method may be used. Examples thereof include core-shell particles manufactured by the following (i) to (v). (i) An aqueous solution containing titanium oxide particles is hydrolyzed by heating, or an alkali is added to an aqueous solution containing titanium oxide particles for neutralization to obtain titanium oxide having an average particle diameter of 1 to 30 nm. Subsequently, a slurry obtained by mixing the titanium oxide particles and a mineral acid such that the ratio of titanium oxide particles/mineral acid is in a range of 1/0.5 to 1/2 (molar ratio), is heated at a temperature of 50° C. or higher and the boiling point of the slurry or lower. A compound of silicon (for example, sodium silicate aqueous solution) is added to the resulting slurry containing the titanium oxide particles, a hydrous oxide of silicon is precipitated on the surface of the titanium oxide particles, and a surface treatment is performed. Finally, impurities are removed from the resulting slurry of the surface-treated titanium oxide particles (JP 10-158015 A); (ii) A stable titanium oxide sol having a pH in an acid region, obtained by deflocculating titanium oxide such as hydrous titanium oxide with a monobasic acid or a salt thereof, and an alkyl silicate as a dispersion stabilizer are mixed by an ordinary method, and neutralized (JP 2000-053421 A); (iii) Hydrogen peroxide and metallic tin are added to a mixture aqueous solution of a titanium salt (for example, titanium tetrachloride) or the like simultaneously or alternately, while the molar ratio of $H_2O_2/Sn$ is maintained to 2 to 3, to prepare a basic salt aqueous solution containing titanium. Subsequently, the basic salt aqueous solution is maintained at a temperature of 50 to 100° C. over 0.1 to 100 hours to generate an aggregate of composite colloid containing titanium oxide. Furthermore, an electrolyte in the aggregate slurry is removed to prepare a stable aqueous sol of composite colloidal particles including titanium oxide. Meanwhile, an aqueous solution containing a silicate (for example, sodium silicate aqueous solution) or the like is prepared, and a cation present in the aqueous solution is removed to prepare a stable aqueous sol of composite colloidal particles containing silicon dioxide. 100 parts by mass (in terms of $TiO_2$) of the resulting composite aqueous sol containing titanium oxide and 2 to 100 parts by mass (in terms of $SiO_2$) of the resulting composite aqueous sol containing silicon dioxide are mixed, an anion is removed, and heat aging is performed at 80° C. for one hour (JP 2000-063119 A); (iv) Hydrogen peroxide is added to a gel or sol of a hydrous titanic acid to dissolve the hydrous titanic acid. A silicon compound or the like is added to the resulting peroxotitanic acid aqueous solution, and the resulting mixture is heated to obtain a dispersion of core particles including a composite solid solution oxide having a rutile type structure. Subsequently, a silicon compound or the like is added to the dispersion of the core particles, then the resulting mixture is heated, and a coating layer is formed on the surface of the core particles to obtain a sol in which the composite oxide particles are dispersed. Finally, the sol is heated (JP 2000-204301 A); (v) To a hydrosol obtained by deflocculating hydrous titanium oxide, a compound selected from an organoalkoxysilane or hydrogen peroxide as a stabilizer ($R^1{}_n SiX_{4-n}$), and an aliphatic or aromatic hydroxycarboxylic acid is added. Aging is performed by adjusting the pH of the solution to 3 or more and less than 9 to perform desalination (JP 4550753 B1).

When both the low refractive index layer and the high refractive index layer include metal oxide particles (the first metal oxide particles and the second metal oxide particles), types of ionicity of these particles are preferably made uniform (that is, charges have the same sign). For example, in a case of forming the refractive index layer, when simultaneous multilayer coating is performed, the same ionicity of the metal oxide particles prevents generation of aggregates at the interface and makes it possible to obtain a better haze. Examples of a method for making the ionicity uniform are as follows. That is, when acidic colloidal silica (anion) is used in the low refractive index layer and titanium oxide (cation) is used in the high refractive index layer, silicon dioxide is treated with aluminum or the like to be cationized. Titanium oxide is treated (coated) with a silicon-containing hydrated oxide to be anionized.

The second metal oxide may be used singly or in mixture of two or more kinds thereof from a viewpoint of adjusting a refractive index.

The second metal oxide particles have an average particle diameter (number average) preferably of 3 to 100 nm, more preferably of 3 to 50 nm.

The content of the second metal oxide particles is preferably from 15 to 85 mass %, more preferably from 20 to 80% by mass, still more preferably from 30 to 75% by mass, with respect to 100% by mass of the total solid content of the high refractive index layer. The content within the above range makes it possible to obtain an excellent infrared shielding property.

First Metal Ion, Second Metal Ion, Curing Agent, Surfactant, and Other Additives These are similar to those described in the low refractive index layer. Therefore, description thereof will be omitted here.

(Low Refractive Index Layer and High Refractive Index Layer)

In the present embodiment, at least one of the low refractive index layer and the high refractive index layer includes a polyvinyl alcohol resin, metal oxide particles, and a first metal ion formed of an alkali metal ion and/or an alkaline earth metal ion.

In this case, the content ratio of the first metal ion represented by the following Formula (1) is 1.25 or less, preferably from 0.1 to 0.8, more preferably from 0.1 to 0.4. By making the content ratio of 1.25 or less (the content ratio of the first metal ion which can be included in the refractive index layer, derived from a raw material of a polyvinyl alcohol resin, a pH adjusting agent, or the like, with respect to the polyvinyl alcohol resin), deterioration of the polyvinyl alcohol (generation of a double bond or conversion into a carboxy group) or the like can be prevented. As a result, the laminated reflective film has excellent discoloration resistance and adhesion between refractive index layers. When the content ratio of the first metal ion with respect to the polyvinyl alcohol resin is 0.1 or more, a preferable viscosity as a coating liquid is obtained, mixing between the layers can be suppressed, and haze can be thereby reduced. Therefore, the content ratio of 0.1 or more is preferable.

[Numerical Formula 4]

$$\text{content ratio of first metal ion} = \frac{\text{content of first metal ion}}{\text{content of polyvinyl alcohol resin}} \times 100 \quad (1)$$

In the above Formula (1), the content of the first metal ion represents a content (% by volume) of the first metal ion included in the refractive index layer. The content (% by volume) of the first metal ion can be measured by an inductively coupled plasma atomic emission spectrometer (ICP-AES) as described above. The content (% by volume) of polyvinyl alcohol resin represents a content (% by volume) of the polyvinyl alcohol included in the refractive index layer. The content (% by volume) of the polyvinyl alcohol resin can be calculated by measuring a content (% by mass) of the polyvinyl alcohol resin included in the refractive index layer, determined from a residual solid content in an evaporation drying method, and dividing the content (% by mass) by a specific gravity of the polyvinyl alcohol resin. In this case, the specific gravity of the polyvinyl alcohol resin can be determined from a gravimeter and a concentration of the polyvinyl alcohol aqueous solution. For example, the specific gravity of a polyvinyl alcohol (PVA 235 manufactured by Kuraray Co., Ltd.) is 1.25.

The phrase "at least one of the low refractive index layer and the high refractive index layer" means that one or both of the low refractive index layer and the high refractive index layer satisfy the above-described conditions. In this case, when a plurality of low refractive index layers and high refractive index layers are laminated alternately, at least one of the laminated refractive index layers is only required to satisfy the above-described conditions. That is, at least one refractive index layer constituting the reflective layer is only required to satisfy the above-described conditions.

However, at least the low refractive index layer preferably includes a polyvinyl alcohol resin, metal oxide particles, and a first metal ion from a viewpoint of obtaining preferable reflection performance, or the like. The low refractive index layer and the high refractive index layer each include a polyvinyl alcohol resin, metal oxide particles, and a first metal ion from a viewpoint of coatability, productivity, or the like. When the low refractive index layer and the high refractive index layer are laminated alternately, all the refractive index layers each include a polyvinyl alcohol resin, metal oxide particles, and a first metal ion.

The content ratio of the first metal ion which can be included in the refractive index layer may be calculated individually. For example, in a preferable embodiment, as a result of using a polyvinyl alcohol resin as a water-soluble polymer, a sodium ion may be mixed in a refractive index layer. In this case, the content ratio of the sodium ion with respect to the polyvinyl alcohol resin in the refractive index layer can be calculated by the following Formula (2).

[Numerical Formula 5]

$$\text{content ratio of sodium ion} = \frac{\text{content of sodium ion}}{\text{content of polyvinyl alcohol resin}} \times 100 \quad (2)$$

In the above Formula (2), the content of sodium ion represents a content (% by volume) of a sodium ion included in a refractive index layer. The content (% by volume) of the sodium ion can be also measured by an inductively coupled plasma atomic emission spectrometer (ICP-AES) individually.

Here, the content ratio of the sodium ion calculated by the above Formula (2) is preferably 1.25 or less, more preferably 0.8 or less, still more preferably 0.4 or less from viewpoints of discoloration resistance and adhesion between refractive index layers. Furthermore, the content ratio of the sodium ion is more preferably from 0.1 to 0.8, still more preferably from 0.1 to 0.4, particularly preferably from 0.2 to 0.4 from a viewpoint of obtaining all of discoloration resistance, adhesion between refractive index layers, and reduction in haze.

In an embodiment, when a refractive index layer includes a potassium ion, the content ratio of the potassium ion with respect to the polyvinyl alcohol resin in the refractive index layer can be calculated by the following Formula (3).

[Numerical Formula 6]

$$\text{content ratio of potassium ion} = \frac{\text{content of potassium ion}}{\text{content of polyvinyl alcohol resin}} \times 100 \quad (3)$$

In the above Formula (3), the content of potassium ion represents a content (% by volume) of a potassium ion included in a refractive index layer. The content (% by volume) of the potassium ion can be also measured by an inductively coupled plasma atomic emission spectrometer (ICP-AES) individually.

Here, when a refractive index layer includes two or more kinds of first metal ions, the content ratio of the first metal ion is calculated as a total of the content ratio of each first metal ion. For example, when a refractive index layer includes only a sodium ion and a potassium ion as the first metal ions, the content ratio of the first metal ion can be determined by a sum of the content ratio of the sodium ion calculated by Formula (2) and the content ratio of the potassium ion calculated by Formula (3).

[Functional Layer]

The infrared shielding film may include one or more functional layers under the substrate or on the outermost layer opposite to the substrate in order to impart additional functions. Examples of the functional layer include a conductive layer, an antistatic layer, a gas barrier layer, an easily adhesive layer (adhesive layer), an antifouling layer, a deodorant layer, a flow dropping layer, an easily slipping layer, a hard coat layer, an abrasion resistant layer, an antireflection layer, an electromagnetic wave shielding layer, an ultraviolet absorbing layer, an infrared absorbing layer, a printing layer, a fluorescent-emitting layer, a hologram layer, a release layer, a pressure sensitive adhesive layer, an adhesive layer, an infrared cut layer other than the low refractive index layer and the high refractive index layer of the present invention (metal layer, liquid crystal layer), a colored layer (visible light absorbing layer), and an intermediate layer used for laminated glass.

The order of laminating the functional layers is not particularly limited. For example, when an infrared shielding film is stuck to the interior side of window glass (inner sticking), as a preferable embodiment, an optical interference film and a pressure sensitive adhesive layer are laminated in this order on a surface of a substrate, and a hard coat layer is coated on the surface of the substrate opposite to the side on which these layers are laminated. The functional layers may be disposed in the order of a pressure sensitive adhesive layer, a substrate, an optical interference film, and a hard coat layer. Another functional layer, a substrate, an infrared absorber, or the like may be further included. When an infrared shielding film is stuck to the exterior side of window glass (outer sticking), as a preferable embodiment, an optical interference film and a pressure sensitive adhesive layer are laminated in this order on a surface of a substrate, and a hard coat layer is coated on the surface of the substrate opposite to the side on which these layers are laminated. The functional layers may be disposed in the order of a pressure sensitive adhesive layer, a substrate, an optical interference film, and a hard coat layer as in the inner sticking. Another functional layer, a substrate, an infrared absorber, or the like may be further included.

<Method for Manufacturing Laminated Reflective Film>

A method for manufacturing the laminated reflective film of the present invention is not particularly limited. Any method can be used as long as it is possible to form a reflective layer including a low refractive index layer and a high refractive index layer on a substrate.

Also for the method for manufacturing a laminated reflective film, an infrared shielding film as a typical example of the laminated reflective film will be described.

An infrared shielding film according to an embodiment of the present invention preferably forms a laminated body by coating a high refractive index layer and a low refractive index layer alternately on a substrate and drying the layers. Specific examples thereof include the following forms. (1) A coating liquid for a high refractive index layer is coated on a substrate and dried to form a high refractive index layer. Thereafter, a coating liquid for a low refractive index layer is coated and dried to form a low refractive index layer. An infrared shielding film is thereby formed. (2) A coating liquid for a low refractive index layer is coated on a substrate and dried to form a low refractive index layer. Thereafter, a coating liquid for a high refractive index layer is coated and dried to form a high refractive index layer. An infrared shielding film is thereby formed. (3) A coating liquid for a high refractive index layer and a coating liquid for a low refractive index layer are coated on a substrate alternately and sequentially in a multilayer form, and then dried to form an infrared shielding film including a high refractive index layer and a low refractive index layer. (4) A coating liquid for a high refractive index layer and a coating liquid for a low refractive index layer are coated on a substrate simultaneously in a multilayer form, and then dried to form an infrared shielding film including a high refractive index layer and a low refractive index layer. Above all, the above method (4) which is a simpler manufacturing process is preferable. When a low refractive index layer and a high refractive index layer are laminated alternately, it is preferable to manufacture an infrared shielding film by simultaneous multilayer coating from a viewpoint of productivity or the like. The infrared shielding film according to an embodiment of the present invention can be manufactured suitably even by the simultaneous multilayer coating which causes mixing of interfaces more easily.

That is, in a preferable embodiment, the method for manufacturing an infrared shielding film includes a step (i) of preparing a coating liquid for a low refractive index layer and a coating liquid for a high refractive index layer, and a step (ii) of forming a reflective layer on a substrate using the coating liquid for a low refractive index layer and the coating liquid for a high refractive index layer prepared in the above step (i).

Hereinafter, each step will be described.

[Step (i)]

The step (i) prepares a coating liquid for a low refractive index layer and a coating liquid for a high refractive index layer.

As described above, it is relatively determined by a relation to an adjacent refractive index layer whether a low refractive index layer or a high refractive index layer formed is a low refractive index layer or a high refractive index layer. Therefore, here, configurations of a typical coating liquid for a low refractive index layer and coating liquid for a high refractive index layer will be described.

(Coating Liquid for Low Refractive Index Layer)

The coating liquid for a low refractive index layer includes a water-soluble polymer and a solvent. In addition, the coating liquid for a low refractive index layer may include first metal oxide particles, a curing agent, a surfactant, and other additives, and the like, if necessary.

Water-Soluble Polymer

A water-soluble polymer similar to that described above can be used. Therefore, description thereof will be omitted here.

The concentration of the water-soluble polymer in the coating liquid for a low refractive index layer is preferably from 0.5 to 10% by mass.

Solvent

As a solvent, water, an organic solvent, or a mixed solvent thereof can be used. In a preferable embodiment of the present invention, a polyvinyl alcohol is used as a water-soluble polymer. Therefore, an aqueous solvent can be used. The aqueous solvent does not require a large-scale manufacturing equipment as compared with a case of using an organic solvent, and therefore is preferable from viewpoints of productivity and environmental protection.

Examples of the organic solvent include an alcohol such as methanol, ethanol, 2-propanol, or 1-butanol, an ester such as ethyl acetate, butyl acetate, propylene glycol monomethyl ether acetate, or propylene glycol monoethyl ether acetate, an ether such as diethyl ether, propylene glycol monomethyl ether, or ethylene glycol monoethyl ether, an amide such as dimethylformamide or N-methyl pyrrolidone, a ketone such as acetone, methyl ethyl ketone, acetylacetone, or cyclohexanone. These organic solvents may be used singly or in mixture of two or more kinds thereof. As a solvent of the coating liquid, water, or a mixed solvent of water and methanol, ethanol, or ethyl acetate is preferably used, and water is more preferably used in terms of environment and simplicity of operation. These aqueous solvents can suppress interlayer mixing by setting a coating film obtained by coating the coating liquid.

First Metal Oxide Particles, Curing Agent, Surfactant, and Other Additives

First metal oxide particles, a curing agent, a surfactant, and other additives similar to those described above can be used. Therefore, description thereof will be omitted here.

(Method for Preparing Coating Liquid for Low Refractive Index Layer)

A method for preparing a coating liquid for a low refractive index layer is not particularly limited. For example, a water-soluble polymer, first metal oxide particles, and an additive are put into a solvent, stirred, and mixed. In this case, the order of adding the components is not particularly limited. The components may be added sequentially and mixed while being stirred. Alternatively, the components may be added simultaneously and mixed while being stirred. If necessary, by using an additional solvent, the coating liquid is adjusted so as to have an appropriate viscosity.

(Coating Liquid for High Refractive Index Layer)

The coating liquid for a high refractive index layer includes a water-soluble polymer and a solvent. In addition, the coating liquid for a high refractive index layer may include second metal oxide particles, a curing agent, a surfactant, and other additives, and the like, if necessary.

A water-soluble polymer, a solvent, second metal oxide particles, a curing agent, a surfactant, and other additives similar to those described above can be used. Therefore, description thereof will be omitted here.

(Method for Preparing Coating Liquid for High Refractive Index Layer)

A method for preparing a coating liquid for a high refractive index layer is not particularly limited. For example, a water-soluble polymer, second metal oxide particles, and an additive are put into a solvent, stirred, and mixed. In this case, the order of adding the components is not particularly limited. The components may be added sequentially and mixed while being stirred. Alternatively, the components may be added simultaneously and mixed while being stirred. If necessary, by using an additional solvent, the coating liquid is adjusted so as to have an appropriate viscosity.

In this case, when the second metal oxide particles are added, preferably, a dispersion of the second metal oxide particles is separately prepared in advance, and added. For example, it is preferable to prepare a coating liquid for a high refractive index layer by adding a dispersion of rutile type titanium oxide having a volume average particle diameter of 100 nm or less, preferably a dispersion of titanium oxide particles coated with a silicon-containing hydrated oxide.

Step (ii)

The step (ii) forms a reflective layer on a substrate using the coating liquid for a low refractive index layer and the coating liquid for a high refractive index layer prepared in the above step (i).

A specific method for forming a reflective layer is not particularly limited. For example, the coating liquid for a low refractive index layer and the coating liquid for a high refractive index layer are coated on a substrate, and then dried.

The coating method is not particularly limited, may be either a sequential coating method or simultaneous multilayer coating, but is preferably simultaneous multilayer coating.

Preferable examples of the coating method include a curtain coating method, a slide bead coating method using a hopper described in U.S. Pat. No. 2,761,419 and U.S. Pat. No. 2,761,791, and an extrusion coating method.

In a case of performing the simultaneous multilayer coating, when the slide bead coating method is used, the temperature of each of the coating liquid for a high refractive index layer and the coating liquid for a low refractive index layer is preferably within a temperature range of 25 to 60° C., more preferably within a temperature range of 30 to 45° C. When the curtain coating method is used, the temperature is preferably in a temperature range of 25 to 60° C., more preferably in a temperature range of 30 to 45° C.

In a case of performing the simultaneous multilayer coating, the viscosity of each of the coating liquid for a high refractive index layer and the coating liquid for a low refractive index layer is not particularly limited. However, when the slide bead coating method is used, the viscosity is preferably within a range of 5 to 100 mPa·s, more preferably within a range of 10 to 50 mPa·s, in the above-described preferable temperature range of the coating liquid. When the curtain coating method is used, the viscosity is preferably within a range of 5 to 1200 mPa·s, more preferably within a range of 25 to 500 mPa·s, in the above-described preferable temperature range of the coating liquid. When the viscosity is within such a range, simultaneous multilayer coating can be performed efficiently.

The viscosity of the coating liquid at 15° C. is preferably 100 mPa·s or more, more preferably from 100 to 30,000 mPa·s, still more preferably from 3,000 to 30,000 mPa·s, most preferably from 10,000 to 30,000 mPa·s.

A specific coating and drying method is not particularly limited. However, when a reflective film is formed by a sequential coating method, one of the coating liquid for a low refractive index layer and the coating liquid for a high refractive index layer heated to 30 to 60° C. is coated on a substrate and dried to form a layer. Thereafter, the other coating liquid is coated on the layer and dried to form a layer. The sequential coating is repeated so as to obtain the number of layers required for exhibiting desired infrared shielding performance to obtain a reflective film precursor.

In drying, it is preferable to dry the formed coating film at 30° C. or higher. For example, drying is preferably performed in a range of a wet bulb temperature of 5 to 50° C. and a film surface temperature of 5 to 100° C. (preferably 10 to 50° C.). For example, drying is performed by blowing warm air at 40 to 60° C. for 1 to 5 seconds. As a drying method, warm air drying, infrared drying, or microwave drying is used. Drying in multi-stage processes is more preferable than drying in a single process. It is more preferable to set the temperature of a falling rate drying portion to be higher than the temperature of a constant rate drying portion. In this case, a temperature range of the constant rate drying portion is preferably from 30 to 60° C., and a temperature range of the falling rate drying portion is from 50 to 100° C.

When a reflective film is formed by simultaneous multilayer coating, the coating liquid for a low refractive index layer and the coating liquid for a high refractive index layer are heated to 30 to 60° C., and coated on a substrate simultaneously in a multilayer form. Thereafter, the formed coating film is temporarily cooled preferably to 1 to 15° C. (setting), and is then preferably dried at 10° C. or higher. More preferable drying conditions are in ranges of a wet bulb temperature of 5 to 50° C. and a film surface temperature of 10 to 50° C. For example, drying is performed by blowing warm air at 80° C. for 1 to 5 seconds. Cooling immediately after coating is preferably performed by a horizontal setting method from a viewpoint of improving uniformity of the formed coating film.

Here, the above-described setting means a step of increasing the viscosity of a coating film composition by lowering the temperature or the like by blowing cold air or the like against the coating film and lowering fluidity of a substance between layers or in each layer or gelling the substance. A state in which nothing is attached to a finger when the finger is pressed onto a surface of the coating film after cold air or the like is blown against the coating film from the surface thereof, is defined as a state in which the setting has been completed.

Time from coating until the setting is completed by blowing a cold air (setting time) is preferably five minutes or less, more preferably two minutes or less. The lower limit of the time is not particularly limited, but is preferably 45 seconds or more. By the setting time of a certain period of time or more, components in a layer can be mixed sufficiently. Meanwhile, by short setting time, interlayer diffusion of metal oxide particles can be prevented, and a difference in refractive index between a high refractive index layer and a low refractive index layer can be made desirable. When an interface between the high refractive index layer and the low refractive index layer rapidly becomes highly elastic, a preferable interface can be formed without providing the setting step.

The setting time can be adjusted by adding other components such as various known gelling agents including gelatin, pectin, agar, carrageenan, and gellan gum, in addition to changing concentrations of a water-soluble polymer and metal oxide particles.

The temperature of the cold air used in the setting step is preferably from 0 to 25° C., more preferably from 5 to 10° C. The time during which the coating film is exposed to the cold air depends on a conveying speed of the coating film, but is preferably from 10 to 360 seconds, more preferably from 10 to 300 seconds, still more preferably from 10 to 120 seconds.

The coating thickness of each of the coating liquid for a low refractive index layer and the coating liquid for a high refractive index layer is only required to be such a preferable dry thickness as described above.

At least one of the coating liquid for a low refractive index layer and the coating liquid for a high refractive index layer includes a polyvinyl alcohol resin, metal oxide particles, and a first metal ion. In this case, a method for manufacturing a laminated reflective film includes steps (1) and (2). In the step (1), a coating liquid including a polyvinyl alcohol resin, metal oxide particles, a metal ion formed of an alkali metal ion and/or an alkaline earth metal ion, and a solvent, is prepared. In the step (2), the coating liquid is coated on a substrate.

In this case, a purification step for controlling the first metal ion in a refractive index layer is preferably further included. The purification step may be performed in a step of preparing a raw material, or in the step (1). For example, a polyvinyl alcohol resin as a raw material is purified in order to reduce a sodium ion included in the polyvinyl alcohol resin as a component derived from the raw material. In addition, for example, the first metal ion is removed from a prepared coating liquid for a refractive index layer in order to reduce the first metal ion derived from a pH adjusting agent or the like in addition to the sodium ion derived from the polyvinyl alcohol resin. A known technique can be appropriately referred to for these methods.

<Infrared Shielding Body>

As described above, in a preferable embodiment of the present invention, a laminated reflective film is used as an infrared shielding film. The infrared shielding film can be applied to a wide range of fields. For example, the infrared shielding film is used as a film for an agricultural greenhouse or a film to be stuck to window such as an infrared shielding film imparting an infrared shielding effect by sticking the film to a facility (substrate) exposed to sunlight for a long time, such as outdoor window or car window, mainly in order to increase weather resistance. Particularly, the infrared shielding film is preferable for a material in which the infrared shielding film according to the present invention is stuck to a substrate such as glass or a resin as a replacement for glass directly or via an adhesive.

That is, another embodiment of the present invention provides an infrared shielding body including a laminated reflective film.

Specific examples of the substrate include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, a urethane resin, a polyvinyl acetate resins, polyvinyl alcohol resin, a styrene resin, a vinyl chloride resin, a metal plate, and ceramics. The kind of the resin may be a thermoplastic resin, a thermosetting resin, or an ionizing radiation curable resin, and these resins may be used in combination of two or more kinds thereof. The substrate can be manufactured by a known method such as extrusion molding, calendering molding, injection molding, blow molding, or compression molding. The thickness of the substrate is not particularly limited, but is usually from 0.1 mm to 5 cm.

An adhesive layer or a pressure sensitive adhesive layer to stick the infrared shielding film to the substrate preferably disposes the infrared shielding film on an incident surface side of sunlight (heat ray). The infrared shielding film sandwiched between window glass and the substrate is preferable because sealing from a surrounding gas such as moisture can be possible and durability is excellent. The infrared shielding film disposed outdoors or outside a car (for outer sticking) is preferable due to environmental durability.

As an adhesive to stick the infrared shielding film to the substrate, an adhesive including a light curable or thermosetting resin as a main component can be used.

The adhesive preferably has resistance to ultraviolet light, and is preferably an acrylic pressure sensitive adhesive or a silicone pressure sensitive adhesive. Furthermore, the acrylic pressure sensitive adhesive is preferable from viewpoints of pressure sensitive adhesive properties and cost. Particularly, a solvent-based acrylic pressure sensitive adhesive is preferable because of easily controlling peeling strength. When a solution polymerization polymer is used as an acrylic pressure sensitive adhesive, a known monomer can be used as a monomer thereof.

A polyvinyl butyral resin used as an intermediate layer of laminated glass or an ethylene-vinyl acetate copolymer resin may be also used. Specific examples thereof include plasticized polyvinyl butyral (manufactured by Sekisui Chemical Co., Ltd., Mitsubishi Monsanto Co., Ltd., etc.), an ethylene-vinyl acetate copolymer (DURAMIN manufactured by DuPont or Takeda Pharmaceutical Company Limited), a modified ethylene-vinyl acetate copolymer (Melthene G manufactured by Tosoh Corporation) and the like. An ultraviolet absorber, an anti-oxidant, an antistatic agent, a heat stabilizer, a lubricant, a filler, a coloring or adhesion control agent, or the like may be added and blended to the adhesive layer appropriately.

EXAMPLES

Hereinafter, the present invention will be described specifically with reference to Examples. However, the present invention is not limited thereto. In Examples, "part" or "%" will be used. Unless otherwise specified, "part" or "%" represents "part by mass" or "% by mass."

Comparative Example 1

Step (i)
1. Preparing Coating Liquid for Low Refractive Index Layer

To 100 parts of a 10% silica aqueous solution (Snowtex OXS) heated to 45° C., 30 parts of a 3% boric acid aqueous solution was added while being stirred. Thereafter, 450 parts of a 5% by mass polyvinyl alcohol (PVA235, manufactured by Kuraray Co., Ltd.) aqueous solution and 375 parts of pure water were added thereto while being stirred to obtain a mixed solution. To the resulting mixed solution, one part of a 5% surfactant aqueous solution (Softazoline LSB-R, manufactured by Kawaken Fine Chemicals Co., Ltd.) was further added while being stirred to prepare a coating liquid for a low refractive index layer.

When the amount of a first metal ion (% by volume) included in the low refractive index layer was measured using an inductively coupled plasma atomic emission spectrometer (ICP-AES) SPS3520uv (manufactured by SII Nano Technology Inc.), the content of a sodium ion was 0.75% by volume, and the other metal ions were not detected.

The content (% by mass) of a polyvinyl alcohol in the low refractive index layer, determined from a residual solid content in an evaporation drying method was 67.10% by mass. When this value was converted into the content (% by volume) in the low refractive index layer using specific gravity 1.25 of the polyvinyl alcohol, 53.70% by volume was obtained.

Therefore, the content ratio of the sodium ion represented by the above Formula (2) is 1.4. The content ratio of the first metal ion represented by the above Formula (1) is 1.4.

2. Preparing Coating Liquid for High Refractive Index Layer

First, a titanium oxide sol dispersion including rutile type titanium oxide was prepared.

A titanium sulfate aqueous solution was subjected to thermal hydrolysis according to a known method to obtain a titanium oxide hydrate. The obtained titanium oxide hydrate was suspended in water to prepare a titanium oxide aqueous suspension ($TiO_2$ concentration: 100 g/L). To 10 L of the titanium oxide aqueous suspension, 30 L of a sodium hydroxide aqueous solution (10 mol/L) was added while being stirred. The resulting mixed solution was subjected to aging at 90° C. for five hours to obtain a base-treated titanium compound. The resulting solution including the base-treated titanium compound was neutralized with hydrochloric acid, filtered, and then washed with water.

The base-treated titanium compound was suspended in pure water such that the $TiO_2$ concentration was 20 g/L. To the resulting suspension, citric acid was added so as to be 0.4 mol % with respect to the mass of $TiO_2$ while being stirred. The resulting mixed solution was heated to 95° C. Concentrated hydrochloric acid was added thereto such that the hydrochloric acid concentration was 30 g/L, and the resulting solution was stirred for three hours to prepare a 20% by mass titanium oxide sol aqueous dispersion including rutile type titanium oxide. At this time, when the pH of the titanium oxide sol aqueous dispersion was measured with a PH meter HM-25R (manufactured by DKK-TOA Corporation), 1.4 was obtained. When a zeta potential was measured with a Zetasizer ZS (manufactured by Malvern Instruments Ltd.), +40 mV was obtained. When a volume average particle diameter and monodispersity were measured with a Zetasizer Nano (manufactured by Malvern Instruments Ltd.), 35 nm and 16% were obtained, respectively.

To 1 kg of the above titanium oxide sol aqueous dispersion, 1 kg of pure water was added to prepare a 10.0% by mass titanium oxide aqueous dispersion.

Next, a silicic acid aqueous solution was prepared. More specifically, a silicic acid aqueous solution in which the content of $SiO_2$ was 2.0% by mass was prepared.

The rutile type titanium oxide in the titanium oxide sol aqueous dispersion was silica-modified using the titanium oxide sol aqueous dispersion and the silicic acid aqueous solution prepared above.

To 0.5 kg of the above titanium oxide sol aqueous dispersion, 2 kg of pure water was added, and then heated to 90° C. Thereafter, 1.3 kg of the silicic acid aqueous solution was gradually added thereto. The resulting mixed solution was heated at 175° C. in an autoclave for 18 hours. The finally obtained solution was concentrated to obtain a 20% by mass silica-modified titanium oxide sol aqueous dispersion including rutile type titanium oxide coated with $SiO_2$ (silica-modified rutile type titanium oxide).

A coating liquid for a high refractive index layer was prepared using the silica-modified titanium oxide sol aqueous dispersion prepared above.

Specifically, to 320 parts of the silica-modified titanium oxide sol aqueous dispersion heated to 45° C., 120 parts of a 1.92% citric acid aqueous solution was added while being stirred. Thereafter, 370 parts of a 5% by mass polyvinyl alcohol (PVA124, manufactured by Kuraray Co., Ltd.) aqueous solution and 90 parts of pure water were added thereto while being stirred. Subsequently, one part of a 5% by mass surfactant aqueous solution (Softazoline LSB-R, manufactured by Kawaken Fine Chemicals Co., Ltd.) was added thereto while being stirred to prepare a coating liquid for a high refractive index layer.

When the amount of a first metal ion (% by volume) included in the high refractive index layer was measured using an inductively coupled plasma atomic emission spectrometer (ICP-AES) SPS3520uv (manufactured by SII Nano Technology Inc.), the content of a sodium ion was 0.32% by volume, and the other metal ions were not detected.

The content (% by mass) of a polyvinyl alcohol in the high refractive index layer, determined from a residual solid content in an evaporation drying method was 21.80% by mass. When this value was converted into the content (% by volume) in the high refractive index layer using specific gravity 1.25 of the polyvinyl alcohol, 17.44% by volume was obtained.

Therefore, the content ratio of the sodium ion represented by the above Formula (2) is 1.8. The content ratio of the first metal ion represented by the above Formula (1) is 1.8.

Step (ii)

3. Forming Infrared Reflective Layer

As a substrate, a polyethylene terephthalate film having a thickness of 50 μm (A4300 manufactured by Toyobo Co., Ltd.: double-sided easily adhesive layer) was used.

Simultaneous multilayer coating of nine layers in total was performed using a slide hopper coating apparatus which can perform 9-layer multilayer coating while the temperatures of the coating liquid for a low refractive index layer and the coating liquid for a high refractive index layer prepared in the step (i) were kept at 45° C. such that the lowermost layer and the uppermost layer were low refractive index layers and the other layers were alternate low refractive index layers and high refractive index layers on a substrate heated to 45° C. In this case, the thicknesses of the low refractive index layer and the high refractive index layer were adjusted to 150 nm and 130 nm, respectively.

Immediately after coating, setting was performed by blowing cold air at 5° C. After completion of setting, drying was performed by blowing warm air at 80° C. to manufacture a laminated reflective film.

Example 1

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 100 parts of the obtained filtrate was removed, and 100 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a low refractive index layer.

When the content of a first metal ion (% by volume) included in the low refractive index layer was measured by a similar method to that in Comparative Example 1, the content of a sodium ion was 0.66% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 1.2. The content ratio of the first metal ion represented by the above Formula (1) is 1.2.

A laminated reflective film was manufactured by a similar method to that in Comparative Example 1 except that the coating liquid for a low refractive index layer prepared above was used.

Example 2

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 550 parts of the obtained filtrate was removed, and 550 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a low refractive index layer.

When the content of a first metal ion (% by volume) included in the low refractive index layer was measured by a similar method to that in Comparative Example 1, the content of a sodium ion was 0.33% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.6. The content ratio of the first metal ion represented by the above Formula (1) is 0.6.

A laminated reflective film was manufactured by a similar method to that in Comparative Example 1 except that the coating liquid for a low refractive index layer prepared above was used.

Example 3

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 700 parts of the obtained filtrate was removed, and 700 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a low refractive index layer.

When the content of a first metal ion (% by volume) included in the low refractive index layer was measured by a similar method to that in Comparative Example 1, the content of a sodium ion was 0.21% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.4. The content ratio of the first metal ion represented by the above Formula (1) is 0.4.

A laminated reflective film was manufactured by a similar method to that in Comparative Example 1 except that the coating liquid for a low refractive index layer prepared above was used.

Example 4

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 850 parts of the obtained filtrate was removed, and 850 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a low refractive index layer.

When the content of a first metal ion (% by volume) included in the low refractive index layer was measured by a similar method to that in Comparative Example 1, the content of a sodium ion was 0.08% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.1. The content ratio of the first metal ion represented by the above Formula (1) is 0.1.

A laminated reflective film was manufactured by a similar method to that in Comparative Example 1 except that the coating liquid for a low refractive index layer prepared above was used.

Example 5

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 550 parts of the obtained filtrate was removed, and 550 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred. 13 parts of a 0.74% potassium acetate aqueous solution was further added thereto while being stirred to prepare a coating liquid for a low refractive index layer.

When the content of a first metal ion (% by volume) included in the low refractive index layer was measured by a similar method to that in Comparative Example 1, the content of a sodium ion was 0.33% by volume, the content of a potassium ion was 0.33% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.6, and the content ratio of the potassium ion represented by the above Formula (3) is 0.6.

Therefore, the content ratio of the first metal ion represented by the above Formula (1) is 1.2.

A laminated reflective film was manufactured by a similar method to that in Comparative Example 1 except that the coating liquid for a low refractive index layer prepared above was used.

Example 6

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 700 parts of the obtained filtrate was removed, and 700 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred. Ten parts of a 0.74% potassium acetate aqueous solution was further added thereto while being stirred to prepare a coating liquid for a low refractive index layer.

When the content of a first metal ion (% by volume) included in the low refractive index layer was measured by a similar method to that in Comparative Example 1, the content of a sodium ion was 0.21% by volume, the content of a potassium ion was 0.21% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.4, and the content ratio of the potassium ion represented by the above Formula (3) is 0.4. Therefore, the content ratio of the first metal ion represented by the above Formula (1) is 0.8.

A laminated reflective film was manufactured by a similar method to that in Comparative Example 1 except that the coating liquid for a low refractive index layer prepared above was used.

Example 7

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 700 parts of the obtained filtrate was removed, and 700 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred. Five parts of a 0.74% potassium acetate aqueous solution was further added thereto while being stirred to prepare a coating liquid for a low refractive index layer.

When the content of a first metal ion (% by volume) included in the low refractive index layer was measured by a similar method to that in Comparative Example 1, the content of a sodium ion was 0.21% by volume, the content of a potassium ion was 0.12% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.4, and the content ratio of the potassium ion represented by the above Formula (3) is 0.2. Therefore, the content ratio of the first metal ion represented by the above Formula (1) is 0.6.

A laminated reflective film was manufactured by a similar method to that in Comparative Example 1 except that the coating liquid for a low refractive index layer prepared above was used.

Example 8

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 850 parts of the obtained filtrate was removed, and 850 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred. Two parts of a 0.74% potassium acetate aqueous solution was further added thereto while being stirred to prepare a coating liquid for a low refractive index layer.

When the content of a first metal ion (% by volume) included in the low refractive index layer was measured by a similar method to that in Comparative Example 1, the content of a sodium ion was 0.08% by volume, the content of a potassium ion was 0.05% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 0.1, and the content ratio of the potassium ion represented by the above Formula (3) is 0.1. Therefore, the content ratio of the first metal ion represented by the above Formula (1) is 0.2.

A laminated reflective film was manufactured by a similar method to that in Comparative Example 1 except that the coating liquid for a low refractive index layer prepared above was used.

Example 9

In the step (i) in Comparative Example 1 for the high refractive index layer, before the surfactant aqueous solution was added, the mixed solution was filtered using a filtration filter (Cefilt UF (MWCO ten thousand), manufactured by NGK Insulators, Ltd.). 300 parts of the obtained filtrate was removed, and 300 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a high refractive index layer.

When the content of a first metal ion (% by volume) included in the high refractive index layer was measured by a similar method to that in Comparative Example 1, the content of a sodium ion was 0.21% by volume, and the other metal ions were not detected.

The content (% by mass) of a polyvinyl alcohol in the high refractive index layer measured by a similar method to that in Comparative Example 1 was 21.80% by mass. When this value was converted into the content (% by volume) in the high refractive index layer, 17.44% by volume was obtained.

Therefore, the content ratio of the sodium ion represented by the above Formula (2) is 1.2. The content ratio of the first metal ion represented by the above Formula (1) is 1.2.

A laminated reflective film was manufactured by a similar method to that in Comparative Example 1 except that the coating liquid for a high refractive index layer prepared above was used.

Example 10

In the step (i) in Comparative Example 1 for the low refractive index layer, before the surfactant aqueous solution was added, the mixed solution was filtered using a filtration filter (Cefilt UF (MWCO ten thousand), manufactured by NGK Insulators, Ltd.). 100 parts of the obtained filtrate was removed, and 100 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a low refractive index layer.

When the content of a first metal ion (% by volume) included in the low refractive index layer was measured by a similar method to that in Comparative Example 1, the content of a sodium ion was 0.66% by volume, and the other metal ions were not detected.

The content (% by mass) of a polyvinyl alcohol in the low refractive index layer measured by a similar method to that in Comparative Example 1 was 67.10% by mass. When this value was converted into the content (% by volume) in the low refractive index layer, 53.70% by volume was obtained.

Therefore, the content ratio of the sodium ion represented by the above Formula (2) is 1.2. The content ratio of the first metal ion represented by the above Formula (1) is 1.2.

In the step (i) in Comparative Example 1 for the high refractive index layer, before the surfactant aqueous solution was added, the mixed solution was filtered using a filtration filter (Cefilt UF (MWCO ten thousand), manufactured by NGK Insulators, Ltd.). 300 parts of the obtained filtrate was removed, and 300 parts of pure water was mixed therein. Using the resulting solution, a solid matter on the filtration filter was collected. One part of a 5% surfactant aqueous solution (Softazoline LSB-R, manufactured by Kawaken Fine Chemicals Co., Ltd.) was added to the collected liquid while being stirred to prepare a coating liquid for a high refractive index layer.

When the content of a first metal ion (% by volume) included in the high refractive index layer was measured by a similar method to that in Comparative Example 1, the content of a sodium ion was 0.21% by volume, and the other metal ions were not detected.

The content (% by mass) of a polyvinyl alcohol in the high refractive index layer measured by a similar method to that in Comparative Example 1 was 21.80% by mass. When this value was converted into the content (% by volume) in the high refractive index layer, 17.44% by volume was obtained.

Therefore, the content ratio of the sodium ion represented by the above Formula (2) is 1.2. The content ratio of the first metal ion represented by the above Formula (1) is 1.2.

A laminated reflective film was manufactured by a similar method to that in Comparative Example 1 except that the coating liquid for a low refractive index layer and the coating liquid for a high refractive index layer prepared above were used.

[Performance Evaluation]

For laminated reflective films manufactured in Examples 1 to 10 and Comparative Example 1, adhesion evaluation, adhesion evaluation (after high-temperature high-humidity test), discoloration evaluation, and haze evaluation were performed.

<Adhesion Evaluation>

A laminated reflective film was subjected to a 1000 time bending test based on a bending test method in conformity to JIS K5600-5-1 (1999) using a bending tester type 1 (Model: IMC-AOF2, mandrel diameter φ20 mm manufactured by Imoto Machinery Co. Ltd.). The laminated reflective film after the test was visually observed to evaluate adhesion according to the following criteria.

○: No peeling is observed between the substrate and a layer or between layers in the laminated reflective film, and abnormality is not observed on the film surface.

Δ: Peeling is slightly observed between the substrate and a layer or between layers in the laminated reflective film, and a lifted portion is observed at an edge of the film surface.

x: peeling is observed between the substrate and a layer or between layers in the laminated reflective film, and waviness is observed on the film surface.

Obtained results are shown in Table 1 below.

<Adhesion Evaluation (after High-Temperature High-Humidity Test)>

A laminated reflective film was allowed to stand under a high temperature and a high humidity, and then adhesiveness evaluation was performed. Specifically, the laminated reflective film was allowed to stand in a thermo machine at 60° C. at 90% RH for 168 hours, and then adhesion was evaluated by a similar manner to the above adhesion evaluation.

Obtained results are shown in Table 1 below.

<Discoloration Evaluation>

A laminated reflective film was allowed to stand under a high temperature and a high humidity, and then discoloration evaluation was performed. Specifically, the laminated reflective film was allowed to stand in a thermo machine at 60° C. at 90% RH for 168 hours, and then the laminated reflective film was visually observed to evaluate discoloration according to the following criteria.

○: Coloring is not observed at all, and no change is observed.

Δ: Coloring is observed slightly. Determination can be performed when samples before and after the high-temperature high-humidity test are compared with each other.

x: Coloring is observed clearly. Determination can be performed even when samples before and after the high-temperature high-humidity test are not compared with each other.

<Haze Evaluation>

A haze value of a laminated reflective film was measured using a haze meter (NDH2000 manufactured by Nippon Denshoku Industries Co., Ltd.) to evaluate the haze according to the following criteria.

○: less than 1%
Δ: 1% or more and less than 2%
x: 2% or more

Obtained results are shown in Table 1 below.

TABLE 1

|  | Low refractive index layer | | | High refractive index layer | | | Adhesion test | | | |
| --- | --- | --- | --- | --- | --- | --- | --- | --- | --- | --- |
|  | Content ratio of first metal ion | Content ratio of sodium ion | Content ratio of potassium ion | Content ratio of first metal ion | Content ratio of sodium ion | Content ratio of potassium ion | Adhesion test | (after high-temperature high-humidity test) | Discoloration | Haze |
| Comparative Example 1 | 1.4 | 1.4 | 0 | 1.8 | 1.8 | 0 | Δ | X | X | X |
| Example 1 | 1.2 | 1.2 | 0 | 1.8 | 1.8 | 0 | ○ | Δ | Δ | ○ |
| Example 2 | 0.6 | 0.6 | 0 | 1.8 | 1.8 | 0 | ○ | Δ | ○ | ○ |
| Example 3 | 0.4 | 0.4 | 0 | 1.8 | 1.8 | 0 | ○ | ○ | ○ | ○ |
| Example 4 | 0.1 | 0.1 | 0 | 1.8 | 1.8 | 0 | ○ | ○ | ○ | Δ |
| Example 5 | 1.2 | 0.6 | 0.6 | 1.8 | 1.8 | 0 | ○ | Δ | Δ | ○ |
| Example 6 | 0.8 | 0.4 | 0.4 | 1.8 | 1.8 | 0 | ○ | Δ | ○ | ○ |
| Example 7 | 0.6 | 0.4 | 0.2 | 1.8 | 1.8 | 0 | ○ | Δ | ○ | ○ |
| Example 8 | 0.2 | 0.1 | 0.1 | 1.8 | 1.8 | 0 | ○ | ○ | ○ | Δ |
| Example 9 | 1.4 | 1.4 | 0 | 1.2 | 1.2 | 0 | Δ | Δ | Δ | ○ |
| Example 10 | 1.2 | 1.2 | 0 | 1.2 | 1.2 | 0 | ○ | Δ | Δ | ○ |

As clear from the results in Table 1, the laminated reflective films in Examples 1 to 10 have excellent adhesion and discoloration resistance even after the high-temperature high-humidity test.

The present application is based on the Japanese Patent Application No. 2013-143026 filed on Jul. 8, 2013. The disclosed contents thereof are incorporated herein by reference as a whole.

The invention claimed is:

1. A laminated reflective film comprising a substrate and a reflective layer including a high refractive index layer and a low refractive index layer disposed on the substrate, wherein at least one of the high refractive index layer and the low refractive index layer includes a polyvinyl alcohol resin, metal oxide particles, and a first metal ion formed of an alkali metal ion and/or an alkaline earth metal ion, and the content ratio of the first metal ion represented by the following Formula (1):

$$\text{content ratio of first metal ion} = \frac{\text{content of first metal ion}}{\text{content of polyvinyl alcohol resin}} \times 100 \quad (1)$$

is 1.25 or less.

2. The laminated reflective film according to claim 1, wherein the low refractive index layer includes the polyvinyl alcohol resin, the metal oxide particles, and the first metal ion.

3. The laminated reflective film according to claim 1, wherein the first metal ion is a sodium ion and/or a potassium ion.

4. The laminated reflective film according to claim 1, wherein the first metal ion includes a sodium ion, and the content ratio of the sodium ion represented by the following Formula (2):

$$\text{content ratio of sodium ion} = \frac{\text{content of sodium ion}}{\text{content of polyvinyl alcohol resin}} \times 100 \quad (2)$$

is 0.4 or less.

5. A method for manufacturing the laminated reflective film according to claim 1, comprising:

preparing a coating liquid including a polyvinyl alcohol resin, metal oxide particles, a metal ion formed of an alkali metal ion and/or an alkaline earth metal ion, and a solvent; and coating the coating liquid on a substrate.

6. An infrared shielding body comprising the laminated reflective film according to claim 1.

7. The laminated reflective film according to claim 2, wherein the first metal ion is a sodium ion and/or a potassium ion.

8. The laminated reflective film according to claim 2, wherein the first metal ion includes a sodium ion, and the content ratio of the sodium ion represented by the following Formula (2):

$$\text{content ratio of sodium ion} = \frac{\text{content of sodium ion}}{\text{content of polyvinyl alcohol resin}} \times 100 \quad (2)$$

is 0.4 or less.

9. A method for manufacturing the laminated reflective film according to claim 2, comprising:

preparing a coating liquid including a polyvinyl alcohol resin, metal oxide particles, a metal ion formed of an alkali metal ion and/or an alkaline earth metal ion, and a solvent; and coating the coating liquid on a substrate.

10. An infrared shielding body comprising the laminated reflective film according to claim 2.

11. The laminated reflective film according to claim 3, wherein the first metal ion includes a sodium ion, and the content ratio of the sodium ion represented by the following Formula (2):

$$\text{content ratio of sodium ion} = \frac{\text{content of sodium ion}}{\text{content of polyvinyl alcohol resin}} \times 100 \qquad (2)$$

is 0.4 or less.

12. A method for manufacturing the laminated reflective film according to claim 3, comprising:

preparing a coating liquid including a polyvinyl alcohol resin, metal oxide particles, a metal ion formed of an alkali metal ion and/or an alkaline earth metal ion, and a solvent; and coating the coating liquid on a substrate.

13. An infrared shielding body comprising the laminated reflective film according to claim 3.

14. A method for manufacturing the laminated reflective film according to claim 4, comprising:

preparing a coating liquid including a polyvinyl alcohol resin, metal oxide particles, a metal ion formed of an alkali metal ion and/or an alkaline earth metal ion, and a solvent; and coating the coating liquid on a substrate.

15. An infrared shielding body comprising the laminated reflective film according to claim 4.

16. An infrared shielding body comprising a laminated reflective film manufactured by the method according to claim 5.

17. The method according to claim 5, further comprising: reducing the metal ion in the coating liquid.

18. The method according to claim 17, wherein the metal ion in the coating liquid is reduced by filtering the coating liquid.

19. The method according to claim 5, further comprising: purifying the polyvinyl alcohol resin to reduce the metal ion in the coating liquid.

* * * * *